(12) United States Patent
Naghi

(10) Patent No.: US 6,402,620 B1
(45) Date of Patent: *Jun. 11, 2002

(54) AMPLIFIED STEREO SOUND AND FORCE FEED BACK ACCESSORY FOR VIDEO GAME DEVICES

(75) Inventor: David Naghi, Los Angeles, CA (US)

(73) Assignee: Technology Creations, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,628

(22) Filed: Mar. 31, 2000

Related U.S. Application Data

(63) Continuation-in-part of application No. 09/205,660, filed on Dec. 2, 1998, now abandoned.

(51) Int. Cl.[7] .............................................. A63F 13/02
(52) U.S. Cl. ........................ 463/47; 463/46; 273/148 B
(58) Field of Search ...................... 463/46–47; 320/110, 320/112–115; 273/148 B

(56) References Cited

U.S. PATENT DOCUMENTS

| | | | |
|---|---|---|---|
| 5,217,295 A | * 6/1993 | Tortola et al. .............. | 362/109 |
| 5,225,760 A | 7/1993 | Leiserson | |
| 5,260,636 A | 11/1993 | Leiserson et al. | |
| D344,260 S | 2/1994 | Leiserson et al. .......... | D13/103 |
| D346,784 S | 5/1994 | Leiserson et al. .......... | D13/103 |
| 5,426,358 A | 6/1995 | Leiserson et al. | |
| 5,481,616 A | * 1/1996 | Freadman ..................... | 381/90 |
| 5,506,488 A | 4/1996 | Leiserson | |
| 5,608,303 A | 3/1997 | Leiserson | |
| 5,643,087 A | 7/1997 | Marcus et al. ................. | 463/38 |
| 5,691,898 A | 11/1997 | Rosenberg et al. ......... | 364/190 |
| 5,897,437 A | 4/1999 | Nishiumi et al. ............. | 463/47 |
| 5,951,317 A | * 9/1999 | Tracy et al. ................. | 439/352 |
| 5,951,399 A | * 9/1999 | Burrell et al. ................ | 463/46 |
| 6,001,014 A | 12/1999 | Ogata et al. .................. | 463/37 |
| 6,004,134 A | 12/1999 | Marcus et al. ................. | 434/45 |
| 6,026,162 A | * 2/2000 | Palett et al. .................. | 379/454 |
| 6,135,450 A | * 10/2000 | Huang et al. ........... | 273/148 B |
| 6,147,674 A | * 11/2000 | Rosenberg et al. ......... | 345/157 |
| 6,163,711 A | * 12/2000 | Juntunen et al. ............. | 455/557 |

* cited by examiner

Primary Examiner—Jessica Harrison
Assistant Examiner—Carmen White
(74) Attorney, Agent, or Firm—Procopio, Cory, Hargreaves & Savitch, LLP

(57) ABSTRACT

An accessory for a hand-held video game device combines an amplified stereo speaker system and a force feed back effect. The accessory includes an audio connector jack adapted for insertion into the device's headphone outlet. The vibration feed back is activated by and proportional to the sound generated from the device, thus allowing a user of the device to control the vibration feed back by adjusting the volume. The accessory allows the user to further control the vibration feed back for any set level of sound generated from the device.

13 Claims, 2 Drawing Sheets

AMPLIFIED STEREO SOUND AND FORCE FEED BACK ACCESSORY FOR VIDEO GAME DEVICES

NOTICE OF RELATED APPLICATIONS

This application is a continuation-in-part of U.S. Ser. No. 09/205,660 filed Dec. 2, 1998 now abandoned, the disclosure of which is specifically incorporated herein by reference.

FIELD OF THE INVENTION

The present invention is in the field of accessories for hand-held video game devices.

BACKGROUND OF THE INVENTION

At the present time there are several competing video game devices vying for consumer dollars in the field of hand-held gaming devices. One of the popular devices today is the Nintendo® Game Boy® device. Different games can be played on the device by using different game cards. Sales of this particular device number in the millions.

There are several accessories that are available for purchase and use with the Nintendo® Game Boy® device. It is possible to buy accessories that provide an amplified sound (while providing an external stereo headphone outlet, the Nintendo® device generates mono sound). Another accessory is a force feed back accessory. When that kind of an accessory is attached to a game device, it creates a force feed back effect in the hand of the user in response to force feed back signals received from the Nintendo device.

Unfortunately, there are no accessories that provide a force feed back effect while at the same time transforming the mono sound generated by the device into an amplified stereo sound. Moreover, none has an ergonomic grip for better control of the accessory. Accordingly, if a user wants the advantages of having stereo sound and a force feed back effect, the user must purchase a stereo headphone set and an accessory providing a force feed back effect.

SUMMARY OF THE INVENTION

The present invention is generally directed to a sound and force feed back accessory for a hand-held video game device. The accessory has a case capable of forming a mechanical connection with the hand-held device. The case has several electrical contacts that, upon mechanical installation of the device into the accessory, connect the accessory with the battery compartment of the device. The case further has mechanically connected to it an audio connector jack to be inserted into the headphone jack at the bottom of the Game Boy device. There is a system of amplified stereo speakers providing the sound for a game. There is also an ergonomic grip made from a soft plastic material and attached to the back of the accessory. The motor drives a weight that will cause a movement sensation in the hand-held device when the device is mechanically and electrically connected to the case. The intensity of the movement is controlled by adjusting the sound generated from the device. The intensity of the movement for any set level of sound can further be controlled by a vibration control knob. A vibration switch allows turning the vibration on and off and keeping the vibration off while turning the sound off.

In a first, separate aspect of the present invention, the accessory combines an amplified stereo speaker system and a vibration feed back mechanism. Thus, one accessory provides both sound enhancement and force feed back for ultimate play experience.

In a second, separate aspect of the present invention, a vibration sensitivity control knob allows the adjustment of the vibration feed back. The vibration feed back is activated and controlled by the sound generated from the game device during play. It is thus dependent on the setting of the Game Boy® volume control. For any set Game Boy® volume level, the vibration feed back can further be adjusted through the vibration control knob.

In a third, separate aspect of the present invention, there is provided an ergonomically designed grip for better control and comfort during game play. The grip preferably is made from a soft plastic material or rubber.

Accordingly, it is a primary object of the present invention to provide a sound and force feed back accessory for a hand-held video game device with a means to adjust the volume of the sound and the intensity of the force feed back.

This and further objects and advantages will be apparent to those skilled in the art in connection with the drawings and the detailed description of the preferred embodiment set forth below.

DETAILED DESCRIPTION OF THE PREFERRED EMBODIMENT

Figure 1:
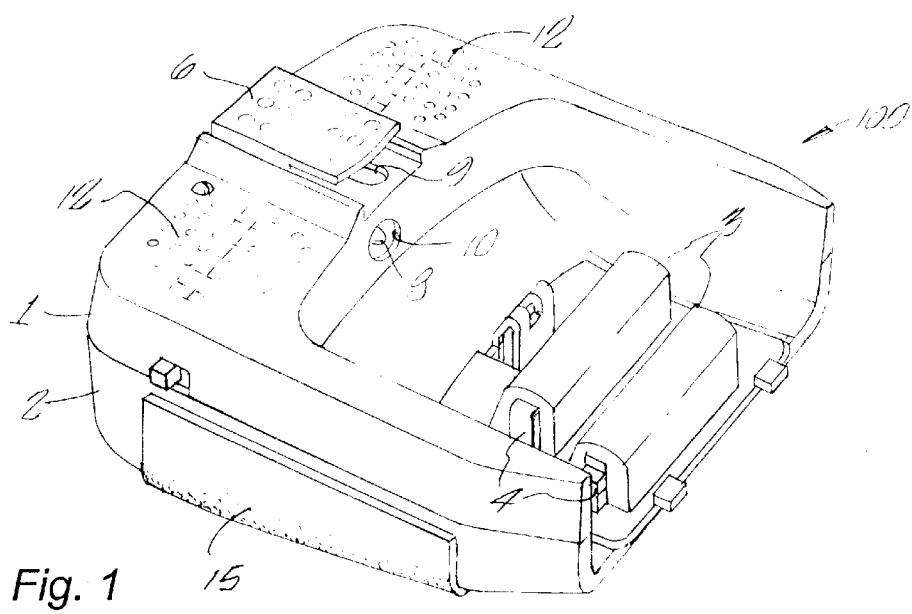
FIGS. 1, 2 and 3 are prospective, back and side views, respectively, of the preferred embodiment of the present invention.
Figure 2:
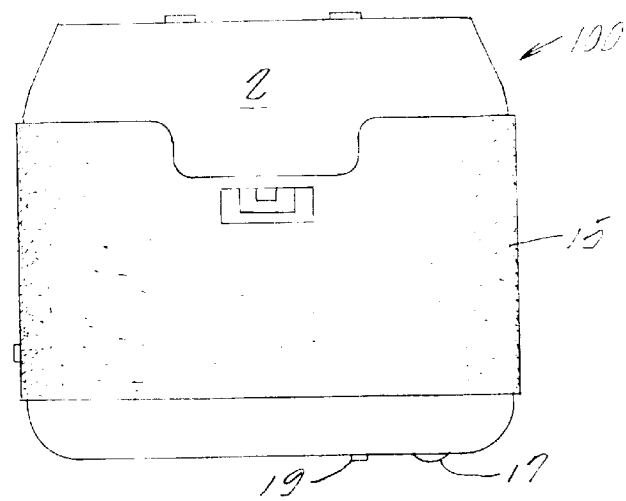
Figure 3:
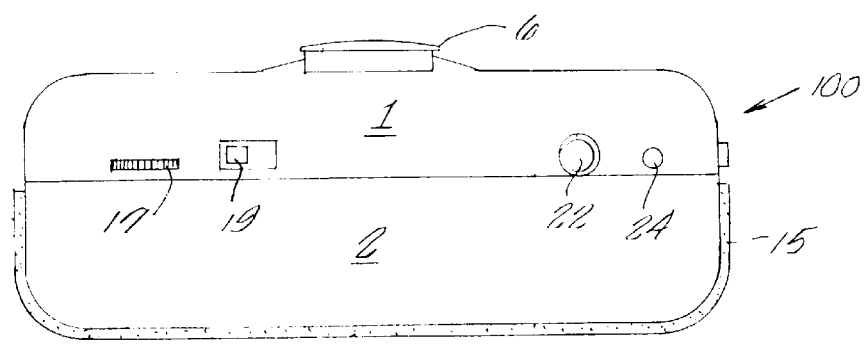

In the preferred embodiment shown in FIGS. 1, 2 and 3, an amplified stereo sound and force feed back accessory is generally depicted as 100. The accessory 100 has a case that has two pieces, 1 and 2. To mechanically attach the accessory to a video game device, such as a hand-held Nintendo® Game Boy® device, two protrusions 3 are adapted for insertion into the battery compartment of the device. The protrusions 3 have metal contacts 4 that serve to electrically connect the device and the accessory.

Figure 4:
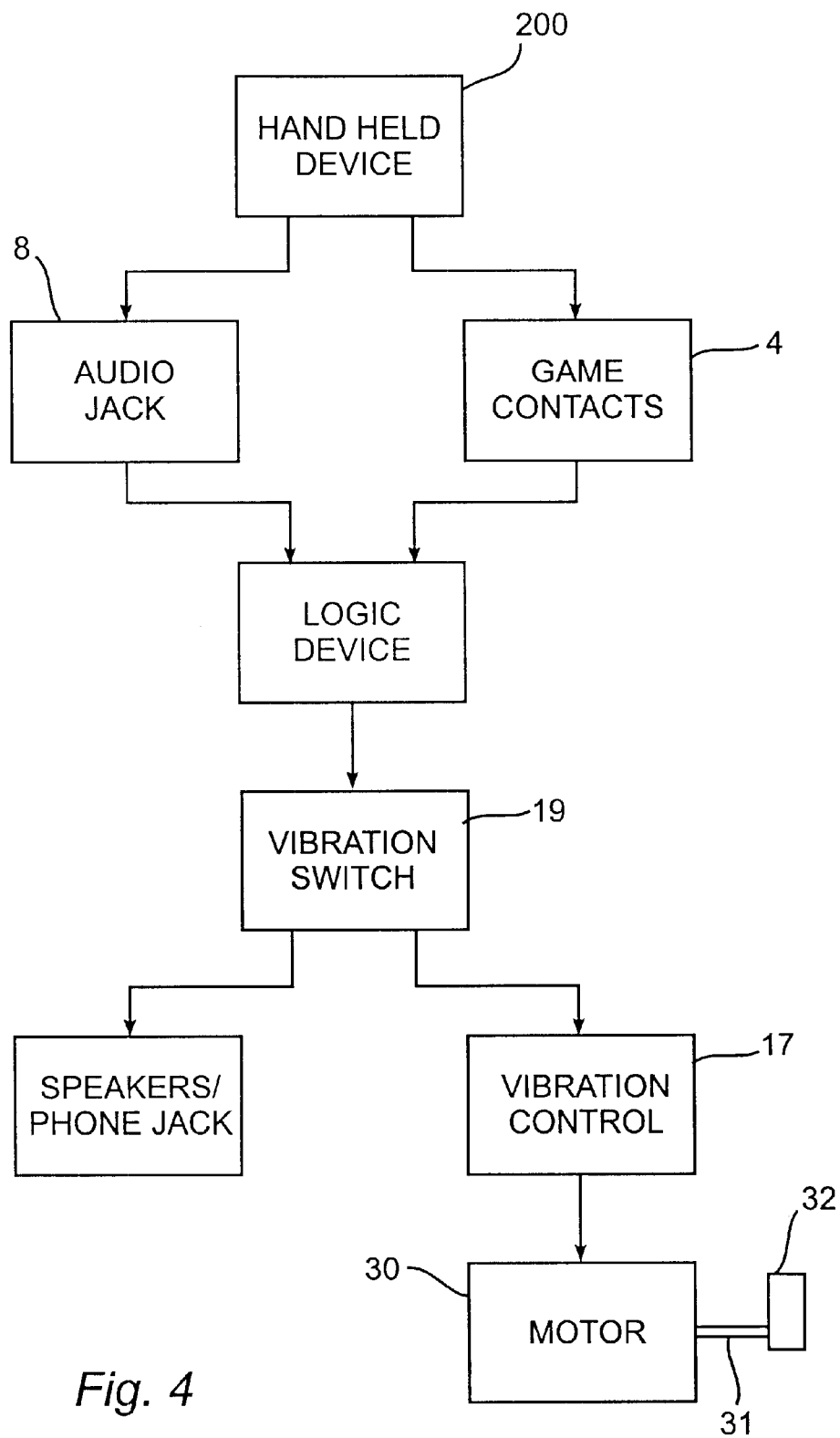
FIG. 4 is a schematic layout of electrical connections in the preferred embodiment of the present invention.

A tab 6 is mechanically connected to the piece 1 of the case so as to slide along the elongated aperture 9 thereby locking the accessory 100 in place to a video game device. An audio connector jack 8 is mechanically attached to the tab 6 and can slide through an aperture 10 as the tab 6 moves along the aperture 9. To complete the attachment of the accessory to the device (which is depicted generally as 200 in FIG. 4), the tab 6 along with the jack 8 should slide completely forward such that the jack 8 enters the headphone outlet at the bottom of the Game Boy® device (not shown).

The case further has an ergonomic rubber grip 15 attached to the piece 2 of the case. The grip is "ergonomic" because it improves the gripping of the device. There are two stereo speakers (not shown) positioned inside the case behind symmetrically located areas 12. Included inside the case is also a motor 30 (FIG. 4) with a connected to it shaft 31. The shaft 31 carries a weight 32. The weight can be connected off-center to the shaft 31 so that it will create the feed back effect when it is rotated about the fixed axis of the shaft 31. The motor is mechanically connected to the case (not shown) to hold it in place.

A printed circuit board (not shown) containing various electronics necessary for the apparatus 100 to properly function is mechanically attached inside the case. The details of such componentry should be well within the grasp of an ordinary designer of electronics, once the details of this disclosure are made known to such a designer. The case also contains two rechargeable batteries (not shown). The power source for the accessory could be entirely external. To use an external power source, the accessory has DC outlet 24, and a 110V AC adapter (not shown) is included.

The vibration feedback to the motion control is keyed off the current to the speakers. As the game sends signals to its speakers to generate volume, the length and intensity of such signals will drive the motor to create the force feed back, with the length and intensity of the force feed back being proportional to the length and intensity of such signals. Moreover, by increasing the volume of the sound generated from the device, the movement generated by the force feed back will also be increased. A vibration switch 19 allows the user to turn on and off the vibration feed back and also to provide the vibration without the sound. The accessory also includes a vibration sensitivity control knob 17. The knob 17 is electrically connected to the vibration switch 19 and the motor 30 and further allows the user to adjust the level of vibrations for any set level of volume.

It will be readily apparent to those skilled in the art that still further changes and modification in the actual concepts described herein can readily be made without departing from the spirit and scope of the invention as defined by the following claims. For example, logic, or variable logic, could be included to control the movement created by the force feed back, by modifying the volume signal received from the game device, or the signal driving the force feed back. Accordingly, the scope of the invention is not intended to be limited except as is required by the lawful scope of the following claims.

What is claimed is:

1. An amplified stereo sound and force feed back accessory for a hand-held video game device, comprising:
    a case mechanically connectable with the hand-held device;
    a plurality of metal contacts forming an electrical contact between the hand-held device and the accessory when the case is mechanically connected to the hand-held device;
    an audio connector jack mechanically connected to the case and insertable into the headphone outlet of the hand-held device for receiving audio signals from the hand-held device;
    an amplified stereo speaker system powered through the audio connector jack when it is inserted into the headphone outlet;
    a motor mechanically connected to the case and actuated by said audio signals;
    a weight that is driven by the motor to cause a movement sensation in the hand-held device when the device is mechanically and electrically connected to the case; and
    a vibration switch for allowing a user of the accessory to activate the motor and/or shut off the sound;
    wherein the movement sensation creates vibration feed back that is activated by and proportional to the sound signals generated from the hand-held device.

2. The accessory as recited in claim 1, further comprising a vibration sensitivity control knob electrically connected to the vibration switch and the motor and allowing the user to control vibration feed back for any set level of sound generated from the hand-held device.

3. The accessory as recited in claim 1, further comprising an ergonomically designed grip attached to the case for better control and comfort during game play.

4. The accessory as recited in claim 3, wherein said grip is made of a plastic material.

5. The accessory as recited in claim 1, further comprising an electrical power source that is contained within the case.

6. The accessory as recited in claim 5, wherein said power source comprises a plurality of rechargeable batteries.

7. The accessory as recited in claim 1, further comprising an outlet for an external power source.

8. The accessory as recited in claim 1, further comprising an external headphone outlet.

9. The accessory as recited in claim 1, wherein the motor causes the weight to rotate about a fixed axis when the motor is activated.

10. An amplified stereo sound and force feed back accessory for a hand-held video game device, comprising:
    a case mechanically connectable with the hand-held device;
    an ergonomically designed grip attached to the case for better control and comfort during game play;
    a plurality of metal contacts forming an electrical contact between the hand-held device and the accessory when the case is mechanically connected to the hand-held device;
    an audio connector jack mechanically connected to the case and insertable into the headphone outlet of the hand-held device for receiving audio signals from the hand-held device;
    an amplified stereo speaker system powered through the audio connector jack when it is inserted into the headphone outlet;
    a motor mechanically connected to the case and actuated by said audio signals;
    a weight that is driven by the motor to cause a movement sensation in the hand-held device when the device is mechanically and electrically connected to the case;
    a vibration switch for allowing a user of the accessory to activate the motor and/or sound in the speaker system;
    an electrical power source that is contained within the case; and
    a vibration sensitivity control knob electrically connected to the vibration switch and the motor;
    wherein the movement sensation creates vibration feed back that is controllable by adjusting the sound generated from the hand-held device and adjusting the vibration sensitivity control knob.

11. The accessory as recited in claim 10, further comprising an outlet for an external power source.

12. The accessory as recited in claim 10, further comprising an external headphone outlet.

13. A method of connecting a sound and force feed back accessory to a hand-held video game device, said accessory comprising electronics, a vibration feedback mechanism, a case enclosing the electronics and feedback mechanism, and an audio connector jack attached to the case, and said device having a headphone outlet, said method comprising the steps of:
    mechanically locking the accessory to the device to secure mechanical and electrical connections between the accessory and the device;
    inserting the audio connector jack of the accessory into the headphone outlet of the device for transferring audio signals from the hand-held device to the vibration feedback mechanism; and
    providing vibration feedback with the vibration feedback mechanism based on the audio signals received.

* * * * *